United States Patent [19]

McGill

[11] 3,768,506
[45] Oct. 30, 1973

[54] HIGH/LOW FLOW SAFETY VALVE
[75] Inventor: Howard L. McGill, Houston, Tex.
[73] Assignee: Schlumberger Technology Corporation, New York, N.Y.
[22] Filed: June 21, 1971
[21] Appl. No.: 155,118

[52] U.S. Cl............... 137/458, 137/460, 137/465, 137/498
[51] Int. Cl............................................. F16k 17/64
[58] Field of Search.................. 137/458, 459, 460, 137/464, 465, 498; 166/224

[56] References Cited
UNITED STATES PATENTS
2,327,055  8/1943  McMahon........................... 137/458
3,050,132  8/1962  Page ............................... 137/460 X
2,935,997  5/1960  Abercrombie..................... 137/458
2,993,504  7/1961  Siezer .............................. 137/458

Primary Examiner—Harold W. Weakley
Attorney—Robert A. White et al.

[57] ABSTRACT
A high/low flow safety valve according to the present invention relates to a valve construction that may be employed in conjunction with flow conduits such as well production tubing and the like. The valve construction is operative to allow the flow of production fluid through the valve structure as long as the volume of flowing pressurized fluid is within an operating range defined by low and high volume limits. As long as fluid flow and consequent pressure differentials are within the volume limits defining the operating range, a ball type safety valve will remain open allowing the flow of production fluid through. In the event the flow of production fluid should reduce below a predetermined minimum operating level, a low flow actuating means will achieve closing of the ball valve and locking means will effectively lock the valve structure against inadvertent reopening. In the event the velocity of flowing fluid should increase above a predetermined maximum a high flow actuating means will become operative and will force a ball valve to its closed position and lock it against inadvertent reopening. The safety valve structure also includes means for unlocking and reopening the safety valve mechanism for the purpose of resuming production flow through the conduit structure with which the safety valve mechanism is associated.

21 Claims, 11 Drawing Figures

PATENTED OCT 30 1973

Howard L. McGill
INVENTOR

BY

Arnold, White & Durkee
ATTORNEYS

FIG. 3A
FIG. 3B
FIG. 4A

Howard L. McGill
INVENTOR

BY

Arnold, White & Durkee
ATTORNEYS

Howard L. McGill
INVENTOR

BY

Arnold, White & Durkee
ATTORNEYS

PATENTED OCT 30 1973 3,768,506
SHEET 4 OF 4

Howard L. McGill
INVENTOR

BY

Arnold, White & Durkee
ATTORNEYS

HIGH/LOW FLOW SAFETY VALVE

FIELD OF THE INVENTION

The present invention relates generally to safety valves and more particularly to a safety valve mechanism that is operative to allow the flow of production fluid as long as the velocity of the flowing production fluid remains within an operating range defined by high and low velocity limits and is effective to completely shut off the flow of production fluid in the event such flow increases above or decreases below allowable velocities.

BACKGROUND OF THE INVENTION

In the early stages of development of the petroleum industry it was typically the practice to tap a pressurized source or reservoir of petroleum products by drilling and to allow any gas pressure that might be contained therein to dissipate to a controllable level or to a level at which the petroleum products might be recovered by pumping. The gas during this particular period was substantially unusable and was generally wasted. Where oil was blown from the well along with the escaping gas, it was the practice to collect the oil in surface ditches constructed about the well site. As the petroleum industry rapidly developed, it was discovered that the pressurized gas within production formations could be efficiently utilized to produce other petroleum products contained therein and the gas itself could be efficiently marketed in its natural state or in other physical states, such as the liquid state, for example. Various developments have been made to ensure against the loss of gas pressure within petroleum reservoirs, but most of the early developments were related to surface control valves and the like that might be manipulated manually or mechanically for flow control purposes.

Although wells may now be effectively controlled to prevent unnecessary escape of gas from the reservoir, occasionally an unforeseen circumstance will develop that may cause a well to blow wild. Surface production control equipment may be damaged by mechanical apparatus operating in the vicinity of the well site and the surface equipment of the well may be otherwise subject to various hazards of the surface environment that could result in blow-out of the well.

When the well is being produced through an offshore facility such as a production platform, the occurrence of an explosion or fire and the like is extremely hazardous to lives of personnel because of the difficulty of escape from the production facility. Offshore explosions and fires are also extremely expensive from a property damage standpoint because of the extremely expensive nature of offshore production facilities. Moreover, an oil spill that might be caused by damage to surface production flow control equipment, located on an offshore production facility, may result in pollution of an extremely large area of the shoreline thereby resulting in extensive damage to wildlife sanctuaries and the like.

Explosions, both at surface flow control equipment and within the well bore below the surface equipment, may result in sufficient damage to allow a particular well to blow wild.

Wells may also blow-out due to shifting of earth stratum through which the well bore passes and likewise, may blow-out due to insufficient structural interconnection between well cement within the well bore and the earth stratum through which the well bore passes, thereby allowing pressurized production fluid to flow around the exterior of the well casing to the surface.

When a well blows wild for any reason whatever, the expense thereof to well drilling and producing companies can be extremely great. Such expense may be caused by loss of production during the time the well is blowing wild and due to the loss of field reservoir pressure which may prevent future production of petroleum products in situ. Loss of reservoir pressure may also substantially slow the production of petroleum products or may make the production of such products extremely expensive by requiring gas lifting operations and secondary recovery operations for effective production.

It is obviously necessary to provide subsurface production flow control mechanisms that may be controllable automatically or selectively as desired to prevent well blow-outs even though surface flow control equipment may be damaged or rendered inoperative. Subsurface production flow control apparatus of this nature may be capable of preventing explosion and fires that otherwise might occur in the event of damage or malfunction of surface flow control systems. Moreover, subsurface flow control safety equipment may effectively prevent the pollution of the surface environment that might otherwise occur if an offshore well is allowed to blow wild. Since subsurface safety valve mechanisms may effectively present a great majority of well blow-outs and since pollution control is so extremely important from the standpoint of conservation, it is obvious that subsurface safety mechanisms are necessary to efficient functioning of the petroleum industry.

THE PRIOR ART

Various well safety systems have been developed involving both surface and subsurface safety equipment that may be actuated to a safe position either automatically as by pilot mechanisms which may be controlled by remote sensing or in the alternative may be actuated selectively or automatically, in response to the development of an adverse well condition, to stop the flow of production fluid until the production equipment may be made safe for further operation.

Offshore wells may include production equipment provided with a "safe mode" that may allow production or may shut-in the well in the event of storms or other hazardous conditions that might otherwise adversely affect production operations.

Surface and subsurface safety valve equipment has been developed that effectively achieves shut-in of surface or subsurface production flow control equipment to terminate the flow of production fluid in the event excessive well pressures should develop and in the event the flow control equipment should be subjected to excessive flow of production fluid. For the most part presently available down-hole safety valve equipment is solely velocity sensitive and remains open to allow the flow of production fluid during periods of normal or low flow of fluid but is actuated by forces developed by high velocity fluid to move the valve structure to the closed position thereby terminating the flow of production fluid. If the velocity of flowing fluid should become abnormally low a safety valve that is solely velocity sensitive would not function to render the flow system safe.

One hazard of virtually every type of safety valve system presently available is that generally the valve seat and other valve closure structure is subjected at all times to adverse well conditions, such as corrosion that might be caused by the well fluid and erosion that might be caused by sand and other foreign matter flowing along with the production fluid. If the safety valve structure is eroded or corroded by flowing production fluid, it may not be capable of functioning properly in the event emergency conditions should subsequently develop.

Another adverse feature of presently available velocity sensitive safety valve mechanisms is that it is typically impossible to impractical to achieve testing of the safety mechanisms to ensure proper functioning thereof without necessitating removal of the valve structure from the well. Also, it may be necessary to remove the string of production tubing from the well which, of course, is an extremely expensive and undesirable operation.

Over and extended period of time, production of the particular reservoir may reduce reservoir pressure and the consequent velocity of flowing production fluid to such a degree that the forces developed thereby may not be sufficient to achieve effective closing of a velocity sensitive safety valve even when the well is allowed to flow in unrestricted manner.

Accordingly, it is a primary object of the present invention to provide a novel safety valve mechanism capable of functioning properly in a down-hole well environment to shut off the flow of production fluid in the event reservoir pressure and consequent velocity of flowing production fluid should increase above or decrease below a predetermined operation range.

It is another object of the present invention to provide a novel safety valve mechanism that is effective to close the production flow passage through the well tubing upon temporary cessation of the flow of production fluid such as might be caused by closing of a surface valve.

An even further object of the present invention contemplates the provision of a novel safety valve construction that is capable of rendering surface flow control equipment safe for repair or servicing without subjecting repair or servicing personnel to hazardous conditions.

It is also an object of the present invention to provide a novel safety valve mechanism that may be simply and effectively tested to ensure proper operation thereof without necessitating expensive testing operations such as the pulling of production tubing, the provision of special testing equipment or removal of the safety valve from the tubing string.

Among the several objects of the present invention is noted the contemplation of a novel safety valve mechanism that may be reopened for further production of fluid through conduit structure with which it may be associated after havbeen closed under emergency conditions simply by increasing pressure within the production conduit downstream of the safety valve mechanism to a pressure in excess of pressure upstream thereof.

It is another feature of the present invention to provide a novel safety valve mechanism that may be implaced and removed by simple wire line equipment thereby providing for simple and inexpensive servicing in the event such should be indicated necessary by a testing procedure.

Another object of my invention involves the provision of a novel safety valve mechanism that is capable of anticipating adverse flow conditions and achieving closure without causing slamming of the valve parts.

My invention also contemplates the provision of a novel safety valve mechanism that is of inexpensive nature and is reliable in use in addition to being low in cost.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise an elongated generally tubular housing within which is movably disposed an actuating sleeve member having a production passage defined therein. A valve element, which may be a spherical plug valve, if desired, is carried by the sleeve member and includes a valve passage that is communicated with the production passage in the open position of the valve to allow the flow of production fluid through the production passage. The valve housing may include means, cooperating with the valve element, to achieve movement thereof between "open" and "closed" position, responsive to movement of the sleeve member within the housing. The sleeve member may be biased in a direction tending to achieve closure of the valve element by a compression spring or by any other suitable biasing means interposed between the sleeve member and the housing structure. A restriction means such as a choke may be disposed within the sleeve structure and is effective to achieve development of a differential pressure with the sleeve structure that creates a force of sufficient magnitude, acting upon the sleeve structure and opposing the biasing means, to overcome the biasing means and maintain the valve element in the open position as long as the flow of production fluid is above a predetermined minimum volume. In the event such flow of production fluid should decrease below the minimum operating volume, the biasing means will overcome the force of production fluid acting upon the sleeve member and induce movement of the valve element to the closed position thereof, thereby ceasing further flow of production fluid.

A high velocity actuating mechanism is incorporated into the housing and is also responsive to predetermined pressure differential to release an actuator that engages the valve actuating sleeve and closes the valve element. The safety valve is therefore closed when the velocity of flowing production fluid becomes excessively low or excessively high.

Detent means may be provided by the valve housing and sleeve to achieve locking of the sleeve member in the position achieving closure of the valve element thereby effectively preventing accidental reopening of the valve element after automatic closure thereof has been achieved. Means may also be provided to unlock the detent mechanism, responsive to selective injection of pressure downstream of the valve element, to substantially balance pressure downstream of the valve element. Such unlocking means may conveniently take the form of a pressure actuated piston having an unlocking cam thereon that disengages the detent mechanism and allows the biasing means to move the sleeve element to a position causing cooperating structure between the valve element and housing to induce movement of the valve element to the open position thereof.

Operating limits of the safety valve construction may be varied by substituting various compression springs or by changing the dimension of the choke orifice.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the embodiment thereof, which is illustrated in the appended drawings, which drawings form a part of this specification.

It is to be noted, however, that the appended drawings illustrate only a typical embodiment of the invention and are, therefore, not to be considered limiting of its scope, for the invention may admit to other equally effective embodiments.

In the drawings.

DESCRIPTION OF THE PREFERRED EMBODIMENT

Figure 1:
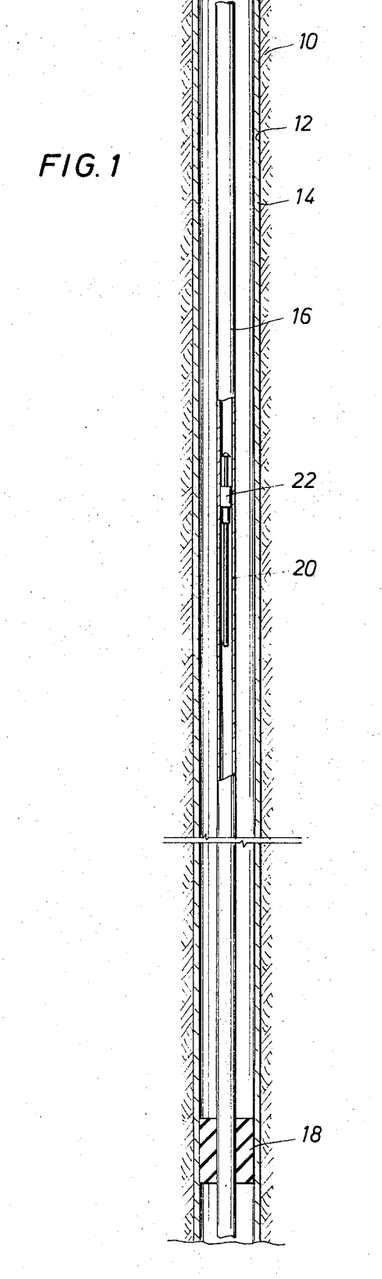
FIG. 1 is a pictorial representation, illustrated partially in section, of a subsurface earth formation having a well bore extended therethrough and being lined with a well casing enclosing a production tubing containing a down-hole safety valve mechanism constructed in accordance with the present invention.

Now referring to the drawings and first to FIG. 1, an earth formation is illustrated at 10 having a well bore 12 drilled therein which is lined with a well conduit 14 that may be cemented in place in conventional manner. Production tubing 16, typically referred to in the industry as a tubing string, extends through the well casing 14 and is sealed with respect to the well casing by a packer 18 located a convenient distance above the production zone of the earth formation. The tubular conduit 16 is open at its lower extremity to production fluid flowing through perforations in the casing 14 and conducts the production fluid upwardly through the tubing string in conventional manner.

For the purpose of shutting off the flow of production fluid through the tubing 16 in the event production flow in the tubing should increase or decrease abnormally, it will be desirable to provide a safety valve mechanism that is responsive to predetermined decrease in the flow of production fluid to close and effectively shut off the flow of fluid. According to the present invention, such safety valve mechanism may conveniently take the form illustrated in the drawings where a safety valve mechanism is depicted generally at 20 that may be installed and removed by conventional wire-line equipment, illustrated generally at 22. It will be convenient to install the safety valve within the tubing string at a level where the temperature is high enough to prevent solidification of paraffin which might otherwise cause fouling of the movable valve parts.

Figure 2:
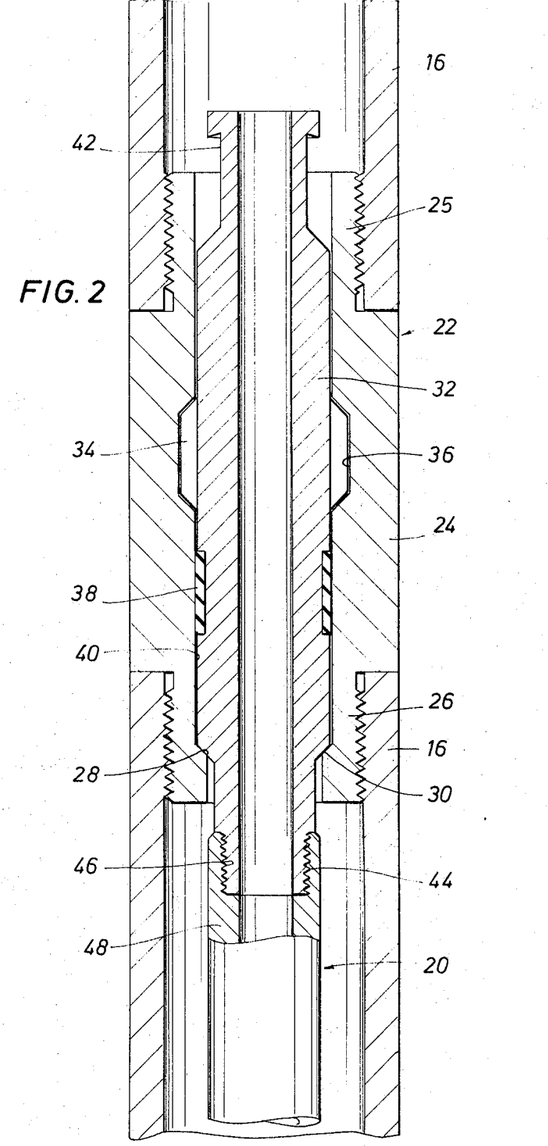
FIG. 2 is a fragmentary sectional view of the well casing structure of FIG. 1 illustrating a typical landing nipple and showing wire-line implacement and retrieval apparatus having a safety valve mechanism, constructed according to this invention, connected to the lower extremity thereof.

With reference now to FIG. 2, the wire-line apparatus 22 is shown to include a landing nipple 24 that may be provided with externally threaded extensions 25 and 26 that receive internally threaded extremities of the production tubing 16. An annular landing shoulder 28 may be defined within the lower extension 26 of landing nipple 24 for engagement by an annular shoulder 30 formed on a wire-line tool 32 thereby preventing the wire-line tool from descending below the level established by annular shoulder 28. Wire-line tool 32 may be provided with locking detents 34 adapted to be received within an annular locking groove 36 defined within landing nipple 24. Wire-line tool 32 may also be provided with a packing 38 of annular configuration for engagement with the cylindrical surface 40, defining a portion of the receptacle for the wire-line tool. As is typically the case, wire-line tool 32 may also be provide with a fishing neck 42 at the upper extremity thereof that may be engaged by appropriate installation and retrieval apparatus of conventional nature.

While the particular wire-line installation and retrieval apparatus 32 is illustrated in FIG. 2, it is to be understood that the particular configuration illustrated is not intended to limit the present invention. It is intended to be obvious that any suitable wire-line tool of conventional nature may be employed within the spirit and scope of the present invention. The wire-line tool 32 may be provided with a lower externally threaded extremity 44 adapted for threaded connection to internal threads 46 formed within the upper cap 47 of an upper housing section 48 of the safety valve mechanism 20, thereby effectively supporting the safety valve in depending relation from the wire-line tool 32.

Figure 3A:
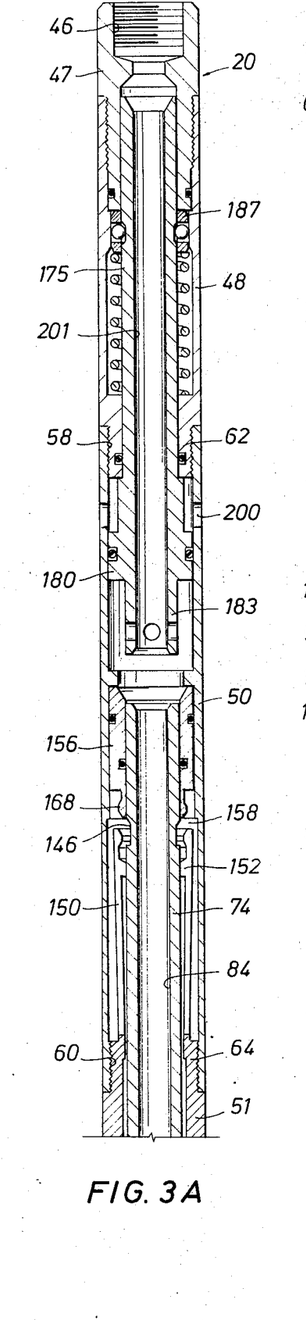
FIGS. 3a and 3b are sectional views of the upper and lower portions respectively of the high/low flow safety valve mechanism of this invention illustrating the moving parts in the normal fluid producing position thereof.
Figures 3B, 4A:
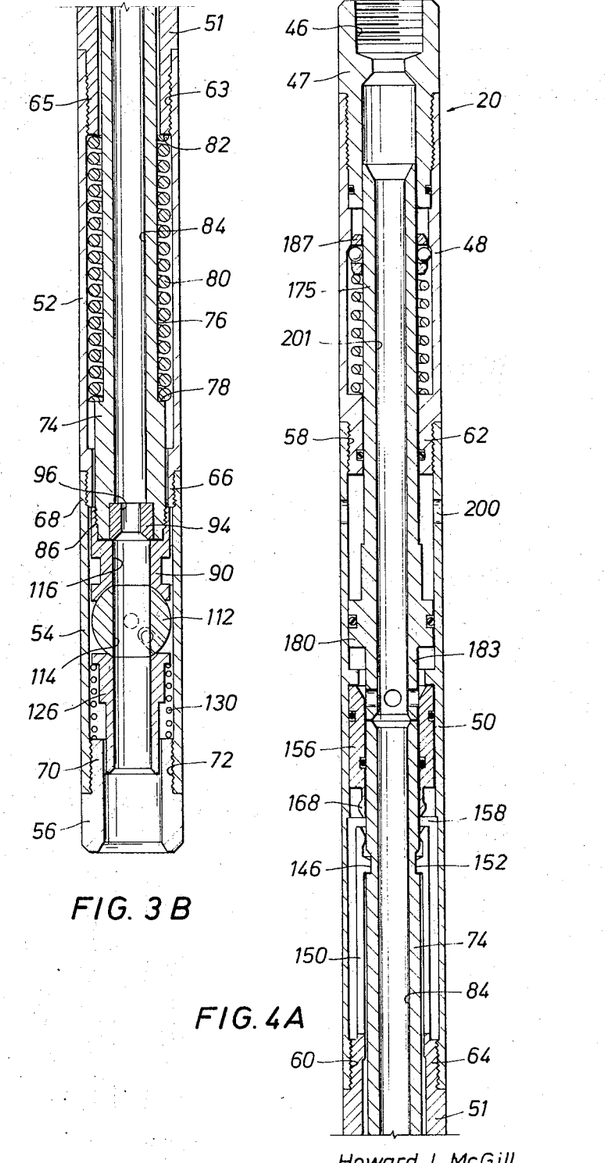
FIGS. 4a and 4b are sectional views of the upper and lower portions respectively of the high/low flow safety valve structure of this invention with the internal moving parts thereof depicted in the closed position.

As depicted in FIGS. 3a and 3b, the safety valve mechanism 20 may include a housing structure defined by cap 47, upper housing section 48, latching section 50, connector section 51, spring housing section 52, valve section 54 and a terminal cap section 56. Latching section 50 may be provided with internally threaded portions 58 and 60 for threaded engagement with the externally threaded portion 62 of upper housing section 48 and the externally threaded portion 64 of the connector section 51. Internal threads 63 of the spring housing section 52 may be connected to an externally threaded extension 65 of the connector section 51. Spring housing section 52 may be provided with an externally threaded extension 66 at the lower extremity thereof to which may be threadedly engaged the internally threaded portion 68 of the valve section 54. Terminal cap section 56 may be provided with an externally threaded extension 70 that may be threadedly received by internal threads 72 defined within the lower extremity of valve section 54.

Figure 8:
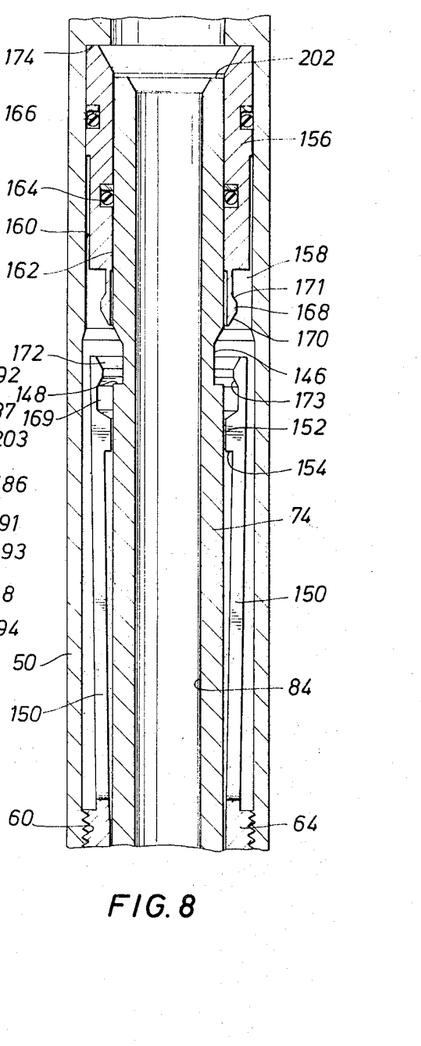
FIG. 8 is a fragmentary sectional view of the upper portion of the safety valve mechanism of this invention illustrating the detent unlocking mechanism in greater detail.

The valve mechanism 20 may be provided with an internal valve actuator sleeve 74, the lower extremity of which is shown in detail in FIG. 8, which may be provided with a reduced diameter portion 76 defining an annular shoulder 78 adapted for engagement by a compression spring member 80 that is disposed within spring housing section 52 and interposed between shoulder 78 and an upper annular shoulder 82 defined by the lower extremity of connector section 51. Compression spring 80 is operative to bias the sleeve member 74 downwardly, as illustrated in the drawings. Although compression spring 80 is illustrated as a metal helical spring, it is intended that any appropriate biasing means may be incorporated into the valve structure to achieve biasing of the sleeve member 74 downwardly in a direction opposing the flow of production fluid without departing from the spirit and scope of the present invention. It is to be understood that the mechanism for imparting movement of the valve element to the closed position thereof may take any desirable form other than a biasing means. For example, a servo mechanism may achieve closure of the valve element responsive to sensing the predetermined flow condition necessary for closure of the safety valve. A production passage 84 may be defined within the sleeve 74 and serves to conduct the flow of production fluid through the valve structure.

Figures 6, 7:
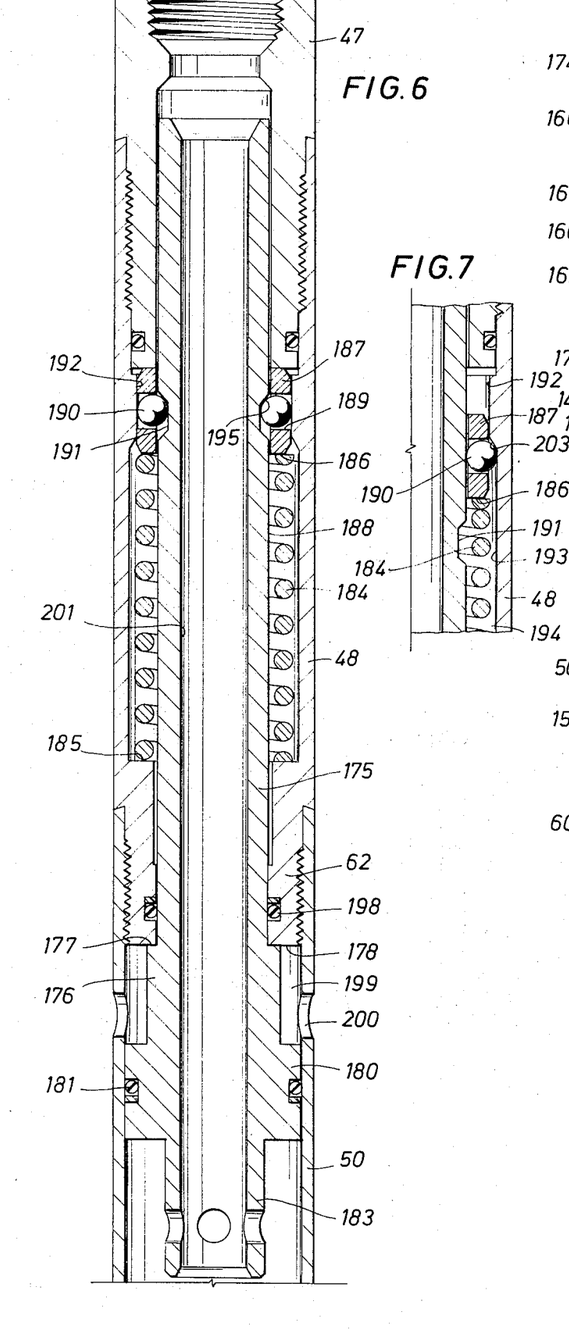
FIG. 6 is a sectional view of the upper portion of the safety valve mechanism of this invention illustrating the velocity sensitive valve actuating portion of the mechanism in the locked position thereof.
FIG. 7 is a fragmentary sectional view of the upper portion of the safety valve mechanism of FIG. 6 showing the velocity sensitive valve actuating portion thereof in its released condition.

The lower extremity of sleeve 74 may be provided with external threads 86, as illustrated in FIG. 7, to which may be threadedly connected the internally threaded portion 88 of a valve and choke support element 90. The lower extremity of sleeve 74 may also be provided with an enlarged diameter choke recess defined by a generally cylindrical bore 92 within which is received a choke member 94 having a restricted flow passage 96 formed therethrough. Annular shoulders 98 and 100 defined, respectively, within sleeve 74 and the valve and choke support element 90, cooperate to retain the choke member 94 in substantially fixed relation relative to the sleeve structure. Annular sealing means 102 may be provided to establish sealed relation between cylindrical surface 92 and sleeve member 74 which, according to the present invention, if desired, may take the form of an O-ring, as illustrated, or, in the alternative, the sealing element 102 may take any other appropriate conventional configuration within the spirit and scope of the present invention.

The valve and choke support element 90 may be provided with an annular groove 104 within which is retained valve support elements, illustrated in broken line at 106, having support extensions 108 defined thereon to which may be connected to trunnions 110 of a rotatable spherical plug member 112. The plug member or valve element may be provided with an internal valve passage 114 that is adapted, in the open position of the valve element, to communicate with a flow passage 116 defined within the support element 90. Support element 90 may also be provided with an annular seat surface 118 disposed for engagement with a spherical working surface 120 on the plug or valve element 112. It is intended that the valve element 112 may take any other appropriate form other than the spherical form within the spirit and scope of this invention.

For the purpose of imparting rotatable movement to valve element 112 between the open and closed positions thereof, a cam groove may be formed in the valve element, as illustrated in broken line at 122, within which may be received a cam element 124 in the form of a pin carried in fixed relation by the valve section 54 of the valve housing. As the valve element is moved downwardly by the sleeve 74 and valve and choke support element 90 under the influence of spring 80 in the direction opposing the flow of production fluid, the interengaged relation between cam element 124 and the cam groove 122 will be operative to effect 90 degree rotation of valve element 112 from the open position thereof, as illustrated in FIGS. 3 and 7, to the closed position thereof, as illustrated in FIG. 4.

Since the flow of production fluid through the valve passage 114 may be quite high, it may be appropriate to provide a means for stabilizing the valve element against shattering forces or vibration that might be created by fluid turbulence and also a means may be provided to direct the flow of fluid smoothly through the valve passage 114. According to the present invention, such stabilizing means may conveniently take the form illustrated in detail in FIG. 8 where a valve stabilizer 126 is shown to be movably disposed within the valve section portion 54 of the valve housing and is provided with a seat surface 128 disposed for engagement with the spherical working surface 120 of valve element 112. A biasing means 130 which, if desired, may take the form of a metallic helical compression spring, may be interposed between a shoulder 132 defined on the valve stabilizer 126 and an annular shoulder 134 defined by the upper extremity of terminal cap section 56 of the valve housing structure. The compression spring 130 is operative to bias the valve stabilizer 126 into engagement with the valve element 112, thereby serving to firmly encapsulate the valve element between sealing surfaces 128 and 118 to enhance the sealing ability of the valve element and to prevent vibration of the valve element by fluid turbulence. The valve stabilizer 126 may also be provided with an extension 136 defining an external guide surface 138 that serves to maintain positive alignment of the valve stabilizer in any particular position thereof and to allow movement of the valve stabilizer as the valve element is reciprocated during opening and closing movements thereof.

A wiping ring 140 may be received within an annular groove 142 formed in the terminal cap section 56 and may be disposed for close fitting relation with the cylindrical surface 138 of the valve stabilizer 126 to prevent foreign matter, that might be contained within the flowing production fluid, from entering the annulus defined between the valve housing and the internal movable parts of the safety valve. The wiper element 140 is not provided for the purpose of establishing a fluid-tight seal, because it is desirable, as will be explained in detail hereinbelow, that fluid pressure be communicated into the annulus for valve control purposes. Fluid communication, from the terminal cap portion 56 of the valve housing to the valve element, may be conveniently provided by fluid passage 144 defined within valve stabilizer 126 that may be appropriately disposed coextensive with valve passage 114 in the open position of the valve element.

With reference now particularly to FIG. 8, a means may be provided for the purpose of locking the sleeve element 74 in the downward position thereof subsequent to actuation of valve element 112 to its closed position and, according to the present invention, such means may conveniently take the form illustrated in FIG. 8 where the sleeve 74 is shown to be provided with an annular locking groove 146 defining an annular shoulder 148. The latching section 50 of the housing structure may include a plurality of latching fingers 150, each being provided with latching detents 152 capable of being received within the latching groove 146 upon movement of sleeve element 74 to the lowermost position thereof. Latching fingers 150 may be spring biased toward such latching engagement to cause locking shoulders 154 of the detents 152 to engage the annular shoulder 148 to restrain or lock the sleeve member 74 in the downward position thereof. It is also within the scope of this invention to provide means other than a mechanical mechanism for maintaining the valve element in its closed position until it is desired to open the valve. A servo mechanism or any other appropriate system may be employed to open the valve selectively or automatically upon restoration of the "safe operating condition."

After the sleeve 74 has moved downwardly to close the valve element 112 and the detents 152 have moved into locking engagement within the latching groove 146, subsequent pressure change upstream of valve element 112 will not be effective to achieve reopening of the valve element. After automatic emergency locking of the sleeve 74 in the valve closing position thereof, it will subsequently become appropriate to unlock the sleeve when it is desired to achieve movement of the valve element to the open position thereof to resume the flow of production fluid. An unlocking means is provided, which, according to the present invention, may conveniently take the form illustrated in FIG. 8 wherein an annular unlocking piston 156 may be movably disposed within an annular chamber 158 defined between an inner wall 160 of upper housing section 48 and an external cylindrical surface 162 defining the upper extremity of sleeve 74 above locking groove 146. Unlocking piston 156 may be provided with an internal sealing element 164 and an external sealing 166 to maintain sealing relation between the unlocking piston and the cylindrical surfaces 162 and 160, respectively.

Figures 4B, 5:
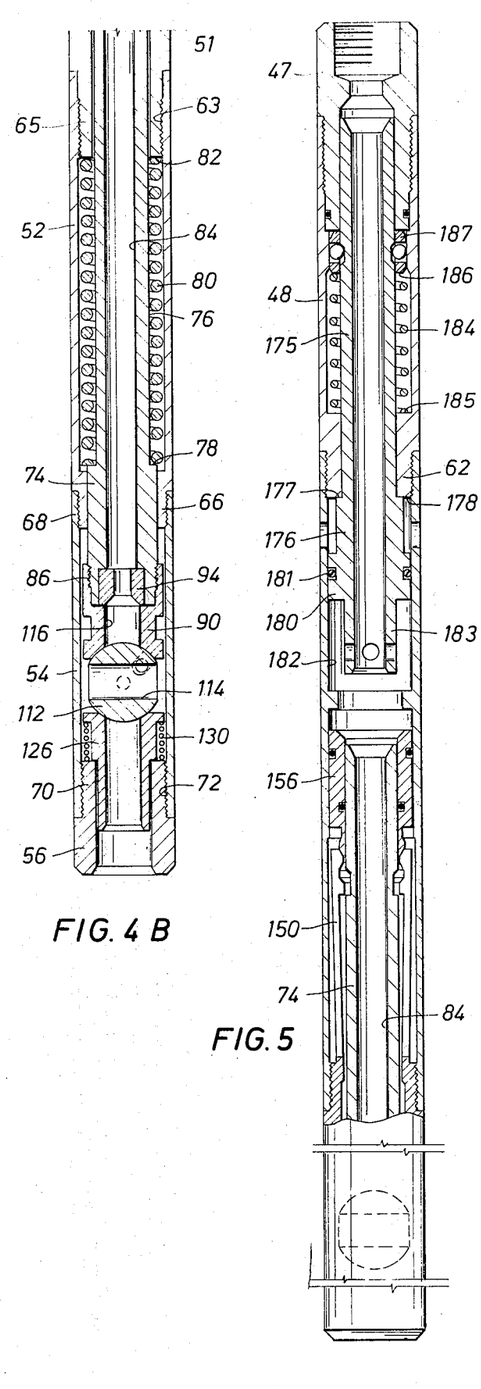
FIG. 5 is a fragmentary sectional view of the safety valve mechanism of this invention illustrating the unlocking mechanism in an intermediate position thereof as it moves to achieve unlocking of the latching detent mechanism and with the valve actuating sleeve and valve ball shown in the open position thereof.

For the purpose of releasing the latched connection between detent members 152 and the annular shoulder 148, defined by latching groove 146, an unlatching extension 168 may be formed integrally with unlocking piston 156 and may be provided with a forward cam surface 170 disposed for engagement with opposed cam surfaces 172, defined at the upper extremity at each of the latching fingers 150. As unlocking piston 156 is moved downwardly, cam surface 170 will move into engagement with cam surfaces 172 and will actuate the spring fingers outwardly, thereby causing disengagement of the locking shoulders 154 of the spring fingers from the annular shoulder 148 defined on the sleeve 74. During the unlocking movement the unlocking sleeve 156 will move downwardly past the intermediate position thereof as illustrated in FIG. 5 to a fully unlocked position where cam surface 170 moves past cam surfaces 172 and the enlarged portion of the extension 168 is disposed within grooves 169 defined adjacent the extremities of each of the spring fingers 150. A reverse tapered cam surface 171 may also be formed on the unlatching extension 168 and is adapted for camming engagement with tapered cam surfaces 173 formed on the spring fingers. After the unlatching movement has occurred, extension 168 will be retained by grooves 169 and the surfaces 171 and 173 will prevent free movement of the piston 156 upwardly thereby insuring that the detents 152 are prevented from reengaging the shoulder 148 and relocking the sleeve 74. Upon introduction of predetermined pressure within chamber 158 the piston 156 will be urged upwardly with sufficient force to disengage cam surfaces 171 and 173 by springing the fingers 150 outwardly. The piston will then return to its FIG. 8 position. After the unlocking movement has occurred, the sleeve 74 will have been released and will be capable of being moved upwardly to impart rotation to valve element 112 to the open position thereof to resume the flow of production fluid through the valve structure.

Unlocking piston 156 may be designed for movement by fluid pressure that may be applied either by the production fluid or by an actuating fluid applied under pressure from a source located downstream of the safety valve structure. While the valve 112 is disposed in the "production mode" thereof as illustrated in FIG. 7, production fluid under pressure will maintain the unlocking piston 156 at the upper limit of its travel where further upward movement thereof is prevented by a stop shoulder 174.

The high/low flow safety valve mechanism of this invention may also be provided with a velocity sensitive portion that will be operative, responsive to an increase in the flow of production fluid above a predetermined maximum level, to shut off the flow of production fluid. In accordance with the terms of the present invention, such high velocity safety mechanism may conveniently take the form illustrated in FIG. 5, and illustrated in detail in FIG. 6, where there is depicted a high velocity actuating sleeve 175 movably disposed within the upper housing section 48. The sleeve 175 is provided with an enlarged lower portion 176 defining an annular abutment shoulder 177 adapted for abutting contact with an annular shoulder 178 defined by the lower extremity of the externally threaded extension 62 of upper housing section 48. The high velocity actuating sleeve 175 may also be provided with an enlarged piston portion 180 having an annular sealing member 181 defining a dynamic seal between the piston portion and an internal cylindrical wall 182 defined within the latching section of the valve housing. Actuating sleeve 175 may also be provided with a lower extension 183 that is adapted to engage the upper portion of valve actuating sleeve 74 upon downward movement of sleeve 175.

The high velocity actuating sleeve 175 is retained in a FIG. 5 or inoperative position thereof by a compression spring 184 disposed between an internal shoulder 185, defined within the upper housing section 48, and a lower surface 186 of a latching detent carrier ring 187 disposed in close fitting relation about the exterior cylindrical surface 188 of actuating sleeve 175. The annular latching detent carrier ring is provided with a plurality of detent apertures 189 retaining a plurality of generally spherically detents 190 that are received in locking engagement within an annular locking groove 191 defined in the exterior periphery of actuating sleeve 175 and serving to lock the actuating sleeve against free movement. A reduced diameter internal surface 192 is effective to maintain the latching detents 190 disposed within the latching groove 191 for locking purposes. A cylindrical surface 193, defined within the upper housing section 48, cooperates with the exterior cylindrical surface of the high velocity actuating sleeve 175 to define an annular chamber 194 that is of slightly larger dimension than the diameter of the spherical detent members 190. As the high velocity actuating sleeve 175 is urged downwardly in the manner discussed below an annular cam surface 195, acting upon the detents 190, will move the detents and the annular detent retainer 187 downwardly past the lower extremity of cylindrical surface 192. After the detents reach the enlarged annular chamber 194 below cylindrical surface 192, they will be moved outwardly by cam surface 195 to the position illustrated in FIG. 7, thereby extracting the detents from annular groove 191 and releasing the sleeve 175 from the bias of spring 184. The pressure differential at which valve closure will occur may be altered simply by replacing spring 184 with a compression spring of different compressive value.

Upward movement of the high velocity actuating sleeve is limited by the annular shoulder 196 defined by the lower extremity of the threaded extension 62 of housing section 48 which is disposed for engagement with the annular shoulder 197 defined on the actuating sleeve. An annular sealing member 198 is disposed within a groove formed within the threaded extension 62 for the establishment of a dynamic seal between housing section 48 and the cylindrical surface 188 of actuating sleeve 175. The annular seal 198 cooperates with seal 181 to define a sealed chamber 199 into which pressurized actuating fluid flows from the annulus between the tubing string and safety valve through a plurality of apertures 200. The pressure of fluid communicated into chamber 199, of course, will be reservoir or casing pressure. As pressurized production fluid flows through the open spherical plug 112 upwardly it passes through the choke restriction 96 thereby developing a pressure somewhat lower than the pressure below the choke restriction which may be referred to as a pressure drop. Reduced pressure flowing through choke restriction 96 acts upon the lower surface area of the high velocity actuating sleeve 175 producing an upward bias while reservoir pressure acting downwardly upon the piston 180 produces a downward bias. Ordinarily, the downward bias is insufficient to urge the sleeve 175 downwardly against the combined effects of the opposing upward bias of the pressurized production fluid and the upward bias created mechanically by the compression spring 184. The high velocity actuating sleeve 175 therefore will remain in the static position thereof as illustrated in FIG. 6 and the produced production fluid will continue upwardly through a production passage 201 defined within sleeve 175.

As the velocity of flowing production fluid exceeds the predetermined maximum level for which the safety valve mechanism may be designed, the pressure drop created across the choke restriction 96 will be substantially greater thereby causing a much greater resultant force to be exerted by pressurized fluid within chamber 199 which resultant force is of sufficient magnitude to urge the piston 180 downwardly against the upward bias spring 184. When the spring 184 has been overcome, the sleeve 175 will move downwardly slowly as the pressure differential increases until the spherical detents 190 have cleared the lower portion of annular surface 192. When this has occurred, spring 184 urges the detents against the cam surface 195 causing the detent members to move radially outwardly thereby extracting the detents from the annular latching groove 191 and freeing the high velocity actuating sleeve from the opposing influence of compression spring 184. When this has occurred, the piston member 180 and actuating sleeve will be driven downwardly causing the extension 183 to move into abutment with the upper abutment surface 202 of the valve actuating sleeve 74 thereby driving the valve actuating sleeve downwardly and causing rotation of the valve element 112 to the closed position thereof. When sleeve 74 has been moved downward sufficiently to close the plug valve, the annular latching groove 146 will have been moved downwardly sufficiently to cause the detents 152 to establish engagement with annular shoulder 148 thereby locking sleeve 74 against inadvertent upward movement.

The high velocity actuating sleeve will be moved upwardly to its locked position upon injection of pressurized fluid into the tubing string above the safety valve mechanism in the manner described below.

OPERATION

Figure 9:
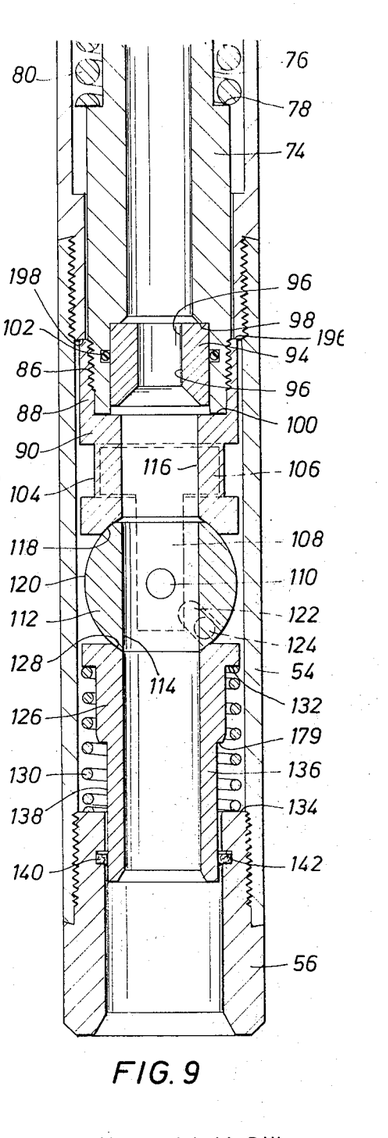
FIG. 9 is a sectional view of the lower portion of the safety valve mechanism of this invention illustrating the structure thereof in greater detail.

Assuming the safety valve mechanism of the present invention to be disposed in the open position thereof, as illustrated in FIGS. 3b and 9, it will be apparent that production fluid will flow from the well casing into the open lower extremity of the safety valve mechanism 20 under reservoir pressure. Since valve element 112 will be maintained in its open position in the production mode, fluid pressure will be communicated through the valve passage 114, the flow passage 116 and through the restricted passage 96 of choke 94 into production flow passage 84. The production fluid will then flow through passage 201 in sleeve 175 and through the wire-line tool passage to the tubing string 16.

As the pressurized production fluid passes through the restricted orifice defined by choke passage 96, a pressure drop will be created across the choke thereby producing a force acting upon the sleeve 74 in a direction opposing the bias of compression spring 80. The force acting through sleeve 74 will be sufficient during normal production flow to overcome the bias of compression spring 80 and maintain the sleeve member 74 at the uppermost position thereof.

The annulus between the valve housing wall and the internal movable parts of the safety valve structure will be subjected to reservoir pressure passing the wiping ring 140 which acts upon the lower surface area defined by the annular unlocking piston 156. Since a reduced pressure will be acting upon the surface area defined by the upper extremity of the unlocking piston 156 by virtue of the choke reduction, the fluid pressures acting upon the piston 156 will be unbalanced thereby creating a resultant force biasing the piston upwardly into engagement with the stop surface 174. The valve and choke support element 90, along with valve element 112, will be moved to their uppermost positions by sleeve 74 and the valve stabilizer 126 will be biased by spring 130 to its uppermost position maintaining a stabiling bias upon the spherical valve element 112. Reduced pressure above the restriction 96 in choke 94 will be communicated to the downwardly facing surfaces of high velocity actuating sleeve 174 and the piston 180. Simultaneously fluid under high reservoir pressure, communicated through apertures 200 will act downwardly upon piston 180 producing a resultant force acting downwardly on piston 180 that is overcome by the upward bias of compression spring 184. Under normal operating velocity conditions or low velocity conditions the high velocity valve actuating apparatus will remain latched in the FIG. 6 position thereof.

LOW FLOW ACTUATION

In the event the flow of production fluid should decrease for any reason whatever, such as by reduction in reservoir pressure, by temporary closing of surface production control valves or by the creation within the production tubing of a pressure approaching the reservoir pressure, the resultant force acting upon sleeve 74, created by the pressure differential across choke 94, will be insufficient to overcome the bias of compression spring 80. The compression spring then will urge the sleeve element 74 downwardly thereby moving the valve and choke support element 90 and consequently the spherical plug valve element 112 downwardly and causing the cam pin 124 acting through cam groove 122 to actuate the valve element to the closed position thereof, as illustrated in FIG. 4b. Downward movement of the sleeve and valve assembly is limited under this condition by an annular stop shoulder 179 defined on the valve stabilizer 126 that is adapted for engagement with shoulder surface 134.

If in the valve closed position of the safety valve, as shown in FIG. 4b, the casing below the safety valve should remain under reservoir pressure even under a reduced pressure condition, such fluid pressure will act through the annulus defined between the valve housing wall structure and the internal moving parts of the valve structure and will bear upon the lower surface area defined by the annular unlocking piston 156, thereby maintaining the unlocking piston at the uppermost position thereof, as illustrated in FIG. 8.

If the production pressure conditions should resume a normal level, subsequent to closing of the spherical plug 112, the valve construction will remain in a closed position because of the latching engagement between the detents 152 of spring fingers 150 which will maintain engagement with the annular shoulder 148 of sleeve 74, thereby preventing the sleeve member from again moving upwardly which would obviously allow opening of the valve element.

The safety valve construction may be opened by selective application of actuating fluid pressure above the valve 112 at a pressure level in excess of reservoir pressure. Such actuating fluid pressure is effective to develop a resultant force, acting upon the upper surface area defined by annular unlocking piston 156, that is greater than the force created by reservoir pressure acting upon the lower surface area of piston 156. The piston therefore will be induced to move downwardly causing the cam surface 170 of the unlocking extension 168 to engage cam surfaces 172 of the spring fingers 150 thereby urging the spring fingers outwardly and releasing shoulders 154 of locking detents 152 from the annular shoulder 148 of the sleeve element. After the spring fingers have been unlatched from the sleeve element there will exist a substantially balanced pressure condition within the valve structure due to substantial balancing between reservoir pressure and the actuating pressure injected into the tubing above the valve element to cause the unlocking movement. Compression spring 80, under this condition, will continue to maintain the sleeve element biased downwardly, thereby maintaining the spherical plug 112 in a closed position thereof.

It will then be necessary to reduce fluid pressure above the valve element simply by bleeding off the same by appropriate manipulation of surface flow control valves, thereby causing reservoir pressure to overbalance actuation pressure above the safety valve. When sufficient pressure differential occurs across the choke to produce a force, acting on the sleeve, that is sufficient to overcome the bias of compression spring 80, the plug member, the valve and choke support element 90 and the sleeve element 74 will be forced upwardly and will thereby cause the plug member 112 to be rotated to the open position thereof by virtue of the interengagement between cam pin 124 and plug groove 122. This movement can take place slowly thereby preventing any slamming of the valve parts which might otherwise cause damage to the valve. During the opening movement the unlocking extension 168 maintains its engagement with spring fingers 150 until sufficient resultant force is developed to cause the unlocking extension to cam the spring fingers outwardly to achieve releasing thereof. This feature eliminates the possibility of relocking of the sleeve which might otherwise occur if the piston were free to move upwardly upon application of insignificant pressure differential. After plug member 112 has been fully opened and full production flow has been resumed, the valve construction will remain static until such time as the flow of pressurized fluid is again reduced to the predetermined minimum level necessary for automatic actuation of the valve to its closed position.

HIGH FLOW ACTUATION

Although the high and low flow valve actuating systems function cooperatively, the operation of each system will be described separately for purposes of simplicity.

Assuming the safety valve 112 to be in the open or production mode and under normal operating conditions, and a valve at the surface should be suddenly opened to allow maximum flow from the reservoir and exceeding the flow velocity for which the high velocity valve actuating mechanism has been designed, there will occur a pressure drop across the choke 94, creating sufficient force, acting upon the choke, to maintain the low velocity actuating section in the open or production mode by producing a relatively weak bias acting upon the lower portion of piston 180 as compared with the bias exerted by reservoir pressure acting through apertures 200 upon the upper portion of piston 180. When this occurs the high velocity actuating sleeve 175 will be forced downwardly by the resultant force acting upon piston 180 thereby compressing the spring 184 and causing downward movement of latching retainer 187 and latching detents 190. After the latching detents have moved downwardly, sufficiently to clear the cylindrical surface 192, as illustrated in FIG. 7, the cam surface 195 of groove 191 will force the detents radially outwardly thereby extracting the detents from the latching groove and completely releasing the valve actuating sleeve 175 from the bias of compression spring 184.

When the sleeve 175 has been completely released from the bias of spring 184, reservoir pressure acting upon piston 180 will force the sleeve 175 downwardly causing the the extended portion 183 thereof to engage the upper extremity of valve actuating sleeve 74 with sufficient force to move the sleeve 74 downwardly thereby causing rotation of valve 112 to its closed position and completely shutting off the flow of production fluid. A bias will be maintained by reservoir pressure acting upon piston 180 to maintain the valve in its closed position. Moreover, the low velocity safety mechanism will function upon closure of valve element 112 by the high velocity actuation mechanism and will prevent reopening of the valve in the event fluid pressure within the reservoir should suddenly decrease.

It should be also noted that movement of the actuating sleeve 74 to a position inducing closure of valve element 112 which also cause movement of the latching detents of spring fingers 150 into engagement within the latching groove of sleeve 74 further preventing inadvertent opening of the valve element in the event pressure conditions should suddenly change.

After the valve has been closed by actuation of the high velocity valve actuation system, the valve again may be reopened simply by introducing fluid pressure into the tubing string at a sufficient level to overbalance the reservoir pressure externally of the safety valve mechanism. Pressure introduced into the tubing string will flow through passage 201 and will act upon the lower extremity of piston 180 thereby forcing the piston and actuation sleeve 175 upwardly. Under this condition the detent retainer 187 and detents 190 will be disposed in the position illustrated in FIG. 7. As the latching groove 191 moves past the detents 190, the upward force produced by the spring 184 will cause the annular cam shoulder 203 to force the detents into the latching groove 191. The retainer will move upwardly to the position illustrated in FIG. 6 where the cylindrical surface 192 functions to prevent the detents from disengaging from the detent groove. In this condition, the high velocity actuating sleeve 175 will again be locked in its uppermost position and will not move downwardly again unless the velocity of flowing fluid should become sufficiently high to again create a predetermined pressure drop across the choke.

At the same time that pressure is injected into the tubing string to move the actuating sleeve 175 to the position shown in FIG. 3A, the same injected pressure will act upon the piston member 156, thereby driving the piston downwardly and urging the unlatching extension 168 into releasing engagement with the spring fingers 150, causing unlocking the sleeve 74, as indicated above. The injected pressure will then be reduced and pressure of the producing formation will act upwardly on the closed valve ball, urging it upwardly to the open position thereof. If formation pressure is excessively low, the valve ball will not be opened because the spring 80 will resist opening movement of the ball until formation pressure is above a predetermined minimum. If the formation pressure is excessively high, the valve ball will open but will be immediately closed by the high velocity actuating sleeve 175 in the manner described above.

TESTING

Assuming that the reservoir pressure remains at an optimum level, but it is deemed appropriate to conduct a test to determine whether the safety valve construction is operative, it will simply be necessary to manipulate surface flow control equipment to reduce or increase the flow of production fluid through the safety valve below or above the predetermined minimum or maximum volume required for automatic actuation of the safety valve. If the valve construction is operative, for low flow actuation, the compression spring 80 will bias sleeve element 74 downwardly inducing closing of the plug member 112 in the manner discussed hereinabove. For high flow actuation, the sleeve 175 and the spring 80 will force the element 74 downwardly to close the plug member 112. Subsequent to the completion of a successful test the safety valve may again be reopened to resume the flow of production fluid simply by injection of fluid pressure into the tubing above the safety valve in the manner discussed hereinabove. The testing procedure is simple, reliable and quite inexpensive. It becomes necessary to remove the safety valve from the well for repair or replacement only when it is determined, through the testing procedure indicated above, that the valve construction is in need of repair or replacement. Moreover, replacement or repair procedures are readily and inexpensively accomplished because it is unnecessary to remove the tubing string from the well. The wire-line tool 32 may be unlocked and retrieved in conventional manner along with the safety valve attached thereto, and subsequent to the valve repair or replacement procedure, may be reinstalled within the well in simple conventional manner.

It will be evident from the foregoing that I have provided a novel high/low flow safety valve mechanism that is capable of functioning properly in a down-hole well environment to shut off the flow of production fluid in the event that flow of production fluid should decrease for any reason whatever below a predetermined operative level or should increase above a maximum allowable velocity. The safety valve mechanism of my invention also effectively achieves closing of the production flow passage through the well tubing upon temporary cessation of the flow of production fluid such as might be caused by closing of a surface valve or by creation within the production tubing of a back pressure sufficient to at least temporarily reduce the flow of production fluid below the predetermined minimum operating level. I have also achieved the provision of a novel safety valve mechanism that may be simply and effectively tested to ensure proper operation thereof at all times without necessitating an expensive testing operation and without requiring removal of the production tubing from the well. Also with the flow of production fluid shut down by simple valve closure the flow of production fluid may be restrained solely by the safety valve mechanism while the surface flow control mechanism may be serviced or repaired without subjecting personnel to hazardous conditions. Multiple effectiveness against inadvertent reopening of the safety valve is achieved since both the low velocity and high velocity systems become actuated when the valve is automatically closed by the high velocity system.

After an emergency shut down, a testing procedure or a procedure involving repair of surface flow control equipment, the safety valve mechanism of my invention may be reopened simply by applying fluid pressure within the production tubing above the safety valve in the manner discussed hereinabove. Such reopening can be achieved effectively without involving slamming of the valve parts which might otherwise occur upon sudden subjection of the valve structure to reservoir pressure. The safety valve mechanism of my invention is adapted for simple connection to a conventional wire-line tool thereby allowing the safety valve to be in place and retrieved by conventional wire-line production tool apparatus. This feature effectively eliminates any necessity for removing the tubing string if it is determined that the safety valve should be cleaned, repaired or replaced. Moreover, the safety valve mechanism of my invention can be effectively employed in a down hole well environment or it may be employed in other flow systems of different nature without departing from the spirit and scope of the present invention. It is therefore seen that this invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without deparing from the spirit or scope thereof, it is to be understood that all matters hereinabove set forth or shown in the accompanying drawings are to be interpreted as illustrative and not any limiting sense.

I claim:

1. A high/low flow safety valve mechanism comprising:
 a housing having means for connection thereof to a production conduit;
 flow passage means defined through said valve mechanism;
 a valve element being disposed within said housing and being movable from an open position allowing the flow of production fluid through the housing to a closed position blocking the flow of production fluid;
 a low velocity actuating mechanism being movably disposed within said housing and being responsive to decrease in the flow of production fluid below a predetermined minimum velocity to cause closure of said valve element;
 a high velocity actuating mechanism being movably disposed within said housing and being responsive to increase in the flow of production fluid above a predetermined maximum velocity to cause closure of said valve element;
 means locking said valve element against reopening after closure thereof; and
 means for selectively unlocking said valve element from the locked condition thereof in response to application of predetermined fluid pressure downstream of said valve element.

2. A high/low flow safety valve mechanism as recited in claim 1:
 a restriction being defined within said flow passage means and developing a pressure differential thereacross;
 said low flow actuating mechanism being responsive to predetermined decrease in said pressure differential to cause closure of said valve element; and
 said high flow actuating mechanism being responsive to predetermined increase in said pressure differential to cause closure of said valve element.

3. A high/low flow safety valve mechanism as recited in claim 2:
 said means for locking said valve element in the closed position subsequent to closure thereof being a mechanical latch mechanism; and said means for selectively unlocking said mechanical latch mechanism being an unlatching piston disposed for linear movement within said housing means, said unlatching piston being movable by pressure introduced into said flow passage downstream of said valve element into unlatching relation with said latch mechanism.

4. A high/low flow safety valve mechanism as recited in claim 1:
 said low velocity actuating mechanism comprising sleeve means movably disposed within said housing and defining a portion of said flow passage means through said housing;
 said valve element being movably supported by said sleeve means;
 means biasing said valve element toward the closed position thereof;
 means for maintaining said valve element in the open position thereof responsive to flow of production fluid at a velocity above a predetermined minimum;
 said means for locking said valve element in the closed position thereof being a mechanical latch mechanism; and
 said means for selectively unlocking said mechanical latch mechanism being an unlatching piston disposed for linear movement within said housing means, said unlatching piston being movable by pressure introduced into said flow passage downstream of said valve element into unlatching relation with said latch mechanism.

5. A high/low flow safety valve mechanism as recited in claim 4:
 said means biasing said valve element toward the closed position thereof being resilient means interposed between said housing and said sleeve means and imparting a bias to said sleeve means;
 said valve element being a spherical plug having a cam groove defined therein; and
 said housing having a projection engaging said cam groove and imparting rotation to said spherical plug upon linear movement of said spherical plug.

6. A high/low flow safety valve mechanism as recited in claim 5:

said means for maintaining said valve element in the open position thereof comprising a choke carried within said sleeve means and defining a restriction within said flow passage means; and said choke restriction being responsive to the flow of production fluid therethrough to develop a pressure differential across said choke and thereby develop a resultant force acting upon said sleeve means and opposing said biasing means.

7. A high/low flow safety valve mechanism as recited in claim 1:

sleeve means being movably disposed within said housing;

said valve element being carried by said sleeve means and imparting opening and closing movement to said valve element upon linear movement of said sleeve means;

said means locking said valve element against reopening after closure thereof comprising latch detent means being defined in said sleeve means;

latch means being carried by said housing;

said latch means and said detent means interengaging to lock said sleeve against movement responsive to movement of said sleeve to a position causing closure of said valve element; and said means for selectively unlocking said valve element being an unlatching piston, said piston engaging said latch means responsive to said application of pressure downstream of said valve element and releasing said latch means from said detent means.

8. A high/low flow safety valve mechanism as recited in claim 1:

sleeve means being movably disposed within said housing; said valve element being carried by said sleeve means and imparting opening and closing movement to said valve element upon linear movement of said sleeve means;

said means for locking said valve element comprising a detent groove formed in said sleeve means;

a plurality of spring fingers being fixed to said housing and having detent means disposed for engagement with said detent groove upon movement of said sleeve means to a position causing closure of said valve element;

said means for releasing said valve element comprising piston means disposed within said housing and having unlatching cam means defined thereon;

said piston means being movable to a position causing said unlatching cam means to engage said spring fingers and retract said detent means from said detent groove thereby releasing said sleeve means in response to application of fluid pressure downstream of said valve element; and said piston means being retracted to the inoperative position thereof in response to application of fluid pressure by said production fluid.

9. A high/low flow safety valve mechanism as recited in claim 1:

said high velocity actuating mechanism comprising a high velocity actuating sleeve having a production flow passage defined therethrough;

means biasing said high velocity actuating sleeve and opposing movement thereof;

means responsive to the velocity of flowing production fluid for developing a pressure differential between the pressure of fluids internally and externally of said housing; and means responsive to development of a predetermined pressure differential to release said high velocity actuating sleeve from said biasing means and impart movement to said high velocity actuating sleeve to achieve closure of said valve element.

10. A high/low flow safety valve mechanism as recited in claim 9:

said means biasing said high velocity actuating sleeve comprising a detent groove defined in said high velocity actuating sleeve;

latch means being received by said detent groove and forming a releasable connection with said high velocity actuating sleeve; and said biasing means being a compression spring interposed between said housing and said latch means and biasing said high velocity actuating sleeve against movement in a direction to actuate said valve element to the closed position thereof.

11. A high/low flow safety valve mechanism as recited in claim 9:

said high velocity actuating sleeve having a piston thereon disposed in movable sealed relation with said housing and defining a piston actuating chamber;

said means for developing a pressure differential comprising a choke restriction disposed upstream of said piston;

means communicating said piston actuating chamber with said production fluid at reservoir pressure; and fluid pressure within said housing downstream of said choke restriction acting upon said piston and opposing the bias established by reservoir pressure acting upon said piston within said actuating chamber.

12. A high/low flow safety valve mechanism as recited in claim 11:

said means biasing said high velocity actuating sleeve comprising a detent groove defined in said high velocity actuating sleeve;

latch means being received by said detent groove and forming a releasable connection with said high velocity actuating sleeve; and biasing means interposed between said housing and serving to bias against movement in a direction to actuate said valve element to the closed position thereof.

13. A high/low flow safety valve mechanism as recited in claim 1:

said low velocity actuating mechanism comprising valve actuating sleeve means movably disposed within said housing and defining a portion of said flow passage means through said housing;

said valve element being movably supported by said valve actuating sleeve means;

means biasing said valve element toward the closed position thereof;

means for maintaining said valve element in the open position thereof responsive to flow of production fluid at a velocity above a predetermined minimum;

said high velocity actuating mechanism comprising a high velocity actuating sleeve having a production flow passage defined therethrough;

means imparting a bias to said high velocity actuating sleeve opposing movement thereof;

means responsive to the velocity of flowing actuating fluid for developing a pressure differential between the pressure of production fluid internally and externally of said housing; and means responsive to development of a predetermined pressure differential to release said high velocity actuating sleeve from said bias and impart movement to said high velocity actuating sleeve to achieve closure of said valve element.

14. A high/low flow safety valve mechanism as recited in claim 13:

said high velocity actuating sleeve moving into abutment with said valve actuating sleeve upon movement thereof by said pressure differential and urging said valve actuating sleeve to a position achieving closure of said valve element.

15. A high/low flow safety valve mechanism as recited in claim 14:

said high velocity actuating sleeve being movable from the valve element actuating position to the initial position thereof upon the introduction into said valve mechanism downstream of said valve element fluid pressure in excess of reservoir pressure.

16. A high/low flow safety valve mechanism comprising:

a housing having means for connection thereof to a production conduit;

a valve actuating sleeve movably disposed within said housing and having a flow passage defined therethrough;

a valve element being carried by said valve actuating sleeve and being movable from an open position allowing the flow of production fluid through said flow passage to a closed position blocking the flow of production fluid;

means for biasing said valve element toward the closed position thereof;

means for maintaining said valve in the open position thereof responsive to flow of production fluid at a velocity above a predetermined minimum and allowing closure of said valve element by said biasing means upon reduction of the flow of production fluid to a velocity below a predetermined minimum;

a high velocity actuating sleeve being movably disposed within said housing and having a production flow passage defined therethrough;

means biasing said high velocity actuating sleeve in a direction opposing movement thereof;

means responsive to the flow of production fluid for developing a pressure differential between the pressure of production fluid internally and externally of said housing; and means responsive to development of a predetermined pressure differential to release said high velocity actuating sleeve from said biasing means and impart movement to said high velocity actuating sleeve to achieve closure of said valve element.

17. A high/low flow safety valve mechanism as recited in claim 16:

said means biasing said high velocity actuating sleeve comprising a detent groove defined in said high velocity actuating sleeve;

latch means being received by said detent groove and forming a releasable connection with said high velocity actuating sleeve; and spring means interposed between said housing and said latch means and biasing said high velocity actuating sleeve against movement in a direction to actuate said valve element to the closed position thereof.

18. A high/low flow safety valve mechanism as recited in claim 16:

said high velocity actuating sleeve having a piston portion disposed in movable sealed relation within a portion of said housing defining a piston actuating chamber;

said means for developing a pressure differential comprising a choke restriction disposed upstream of said piston;

means communicating said piston actuating chamber with said production fluid at reservoir pressure; and fluid pressure within said housing downstream of said choke restriction acting upon said piston portion and opposing the bias established by reservoir pressure acting upon said piston portion within said actuating chamber.

19. A high/low flow safety valve mechanism as recited in claim 18:

said means biasing said high velocity actuating sleeve comprising a detent groove defined in said high velocity actuating sleeve;

latch means being received by said detent groove and forming a releasable connection with said high velocity actuating sleeve; and spring means interposed between said housing and serving to bias against movement in a direction to actuate said valve element to the closed position thereof.

20. A high/low flow safety valve mechanism as recited in claim 19:

said high velocity actuating sleeve moving into abutment with said valve actuating sleeve upon movement thereof by said pressure differential and urging said valve actuating sleeve to a position achieving closure of said valve element.

21. A high/low flow safety valve mechanism as recited in claim 20:

said high velocity actuating sleeve being movable from the valve actuating position to the initial position thereof upon the introduction into said valve mechanism downstream of said valve element fluid pressure in excess of reservoir pressure.

* * * * *